United States Patent
Ben-Zur et al.

(10) Patent No.: US 7,203,319 B2
(45) Date of Patent: Apr. 10, 2007

(54) APPARATUS AND METHOD FOR INSTALLING A DECRYPTION KEY

(75) Inventors: Liat Ben-Zur, San Diego, CA (US);
Curtis D. Mursfeldt, San Diego, CA (US); Christopher Wingert, San Diego, CA (US); Paul Pomes, Urbana, IL (US); Jesse Hose, Carlsbad, CA (US); Ann C. Irvine, Bonsall, CA (US); Senthil Govindaswamy, San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 1142 days.

(21) Appl. No.: 09/902,173

(22) Filed: Jul. 9, 2001

(65) Prior Publication Data

US 2003/0007643 A1    Jan. 9, 2003

(51) Int. Cl.
*H04L 9/00* (2006.01)
(52) U.S. Cl. ............... 380/283; 380/284; 380/278
(58) Field of Classification Search ........... 380/283, 380/277–278, 284
See application file for complete search history.

(56) References Cited

U.S. PATENT DOCUMENTS

| 5,144,664 A | 9/1992 | Esserman et al. |
| 5,237,610 A | 8/1993 | Gammie et al. |
| 6,035,037 A | 3/2000 | Chaney |

OTHER PUBLICATIONS

An ID-based broadcast encryption scheme for key distribution Xinjun Du; Ying Wang; Jianhua Ge; Yumin Wang; Broadcasting, IEEE Transactions on vol. 51, Issue 2, Jun. 2005 pp. 264-266.*
A Key Distribution Scheme for Secure Multicast Over IPv6 Wireless Networks Aye, W.; Siddiqi, M.U.; Information and Telecommunication Technologies, 2005. APSITT 2005 Proceedings. 6th Asia-Pacific Symposium on Nov. 9-10, 2005 pp. 322-327.*
Comparison of scalable key distribution schemes for secure group communication Dondeti, L.R.; Mukherjee, S.; Samal, A.; Global Telecommunications Conference, 1999. GLOBECOME '99 vol. 3, 1999 pp. 1774-1778 vol. 3.*

* cited by examiner

*Primary Examiner*—David Jung
(74) *Attorney, Agent, or Firm*—Philip R. Wadsworth; Sandip (Micky) S. Minhas; Dang Vo

(57) ABSTRACT

An apparatus for installing a decryption key is initially arranged so that a decryption algorithm received by a control processor is passed via a first interface path to a decryption processor. The algorithm is installed in the decryption processor together with a program decryption key. The apparatus is subsequently arranged so that encrypted working decryption keys received by the control processor are passed on to the decryption processor over the first interface path. The decryption processor decrypts the encrypted keys using the program decryption key. Decryption keys are thus obtained and are transferred via a second interface path to decryptors for use in decrypting encrypted program signals input to the decryptors.

41 Claims, 5 Drawing Sheets

APPARATUS AND METHOD FOR INSTALLING A DECRYPTION KEY

BACKGROUND OF THE INVENTION

I. Field of the Invention

The present invention relates to a method and apparatus for installing a decryption key. The invention may be usefully employed in the newly emerging field of digital cinema.

II. Description of the Related Art

In the traditional film industry, theatre operators receive reels of celluloid film from a studio or through a distributor for eventual presentation in a theatre auditorium. The reels of film include the feature program (a full-length motion picture) and a plurality of previews and other promotional material, often referred to as trailers. This approach is well established and is based in technology going back around one hundred years.

Recently an evolution has started in the film industry, with the industry moving from celluloid film to digitized image and audio programs. Many advanced technologies are involved and together those technologies are becoming known as digital cinema. It is planned that digital cinema will provide a system for delivering full length motion pictures, trailers, advertisements and other audio/visual programs comprising images and sound at "cinema-quality" to theatres throughout the world using digital technology. Digital cinema will enable the motion picture cinema industry to convert gracefully from the century-old medium of 35 mm film into the digital/wireless communication era of today. This advanced technology will benefit all segments of the movie industry.

The intention is that digital cinema will deliver motion pictures that have been digitized, compressed and encrypted to theatres using either physical media distribution (such as DVD-ROMs) or electronic transmission methods, such as via satellite multicast methods. Authorized theatres will automatically receive the digitized programs and store them in hard disk storage while still encrypted and compressed. At each showing, the digitized information will be retrieved via a local area network from the hard disk storage, be decrypted, decompressed and then displayed using cinema-quality electronic projectors featuring high quality digital sound.

Digital cinema will encompass many advanced technologies, including digital compression, electronic security methods, network architectures and management, transmission technologies and cost-effective hardware, software and integrated circuit design. The technologies necessary for a cost-effective, reliable and secure system are being analyzed and developed. These technologies include new forms of image compression, because most standard compression technologies, such as MPEG-2, are optimized for television quality. Thus, artifacts and other distortions associated with that technology show up readily when the image is projected on a large screen. Whatever the image compression method adopted, it will affect the eventual quality of the projected image. Special compression systems have therefore been designed specifically for digital cinema applications to provide "cinema-quality" images at bit rates averaging less than 40 Mbps. Using this technology a 2-hour movie will require only about 40 GB of storage, making it suitable for transportation on such media as so-called digital versatile disks (DVDs) or transmission or broadcast via a wireless link.

While this has obvious advantages in terms of the distribution of movies, it brings with it its own problems in that in itself such transportation and transmission is not secure. Encryption and conditional access methods are therefore also being developed with the aim of preventing piracy of movies. Encryption provides good protection against unauthorized access, but only so long as the key to the encryption remains secret. If the key is accessible then encryption is of no use at all, because a thief will easily be able to decrypt the movie data and thus steal the movie.

SUMMARY OF THE INVENTION

The invention aims to provide increased security for the encryption key itself, so as to reduce the likelihood of the key and hence the movie from being stolen.

According to one aspect of the invention, there is provided a decryption system comprising: a decryption unit for decrypting encrypted program signals using a working decryption key; a receiver for receiving signals including encrypted data defining the working decryption key; a processor; and an interface providing a first path for transferring the encrypted data from the receiver to the processor and providing a second path, separate and independent of the first path, for transferring data from the processor to the decryption unit; and wherein the processor is configured to decrypt the encrypted data using a program key so as to extract the working decryption key from the encrypted data, and to output the working decryption key for transfer via the second path of the interface to the decryption unit.

According to another aspect of the invention there is provided an apparatus for decrypting encrypted program signals, the apparatus comprising: receiving means for receiving encrypted key signals containing data defining a working decryption key; means for transferring the encrypted key signals via a first interface; first means, connected to the first interface, for decrypting the encrypted key signals, using a program key in a decryption algorithm, to determine the working decryption key; means for transferring the working decryption key via a second interface, different and operationally separate from the first interface; and second means, connected to the second interface, for decrypting the encrypted program signals using the working decryption key, and wherein the decryption algorithm is supplied together with the program decryption key via the receiving means and is downloaded therefrom to the first means for decrypting.

According to a further aspect of the invention there is provided an apparatus in which, initially, a decryption algorithm received by a control processor is passed via a first interface path to a decryption processor where it is installed together with a program decryption key extracted there from, and, subsequently, encrypted working decryption keys received by the control processor are passed on to the decryption processor over the first interface path at which decryption processor they are decrypted using the program decryption key to obtain working decryption keys that are then transferred via a second interface path to decryptors for use in decrypting encrypted program signals input to the decryptors.

According to another aspect of the invention there is provided a method for installing a decryption key, in which, initially, a decryption algorithm received by a control processor is passed via a first interface path to a decryption processor where it is installed together with a program decryption key extracted therefrom, and, subsequently, encrypted working decryption keys received by the control processor are passed on to the decryption processor over the first interface path at which decryption processor they are decrypted using the program decryption key to obtain working decryption keys that are then transferred via a second interface path to decryptors for use in decrypting encrypted program signals input to the decryptors.

The invention also provides a method for installing a decryption key, the method comprising: receiving signals including encrypted data defining a working decryption key; transferring the encrypted data over a first path to a processor; decrypting the encrypted data at the processor using a program key so as to extract the working decryption key from the encrypted data; outputting the working decryption key for transfer over a second path, separate and independent of the first path, to a decryption unit; and decrypting encrypted program signals in a decryption unit using the working decryption key.

The invention further provides a method for decrypting encrypted program signals, the method comprising: receiving encrypted key signals containing data defining a working decryption key; transferring the encrypted key signals via a first interface; decrypting the encrypted key signals, using a program key in a decryption algorithm, to determine the working decryption key; transferring the working decryption key via a second interface, different and operationally separate from the first interface; and decrypting the encrypted program signals using the working decryption key, and wherein the decryption algorithm is supplied together with the program decryption key via the receiving means and is downloaded therefrom to the first means for decrypting.

BRIEF DESCRIPTION OF THE DRAWINGS

The above and further features of the invention are set forth with particularity in the appended claims and together with advantages thereof will become clearer from consideration of the following detailed description of an exemplary embodiment of the invention given with reference to the accompanying drawings, in which:

DETAILED DESCRIPTION OF AN EMBODIMENT OF THE INVENTION

The following description is intended to provide both an overview of a digital cinema system in which the invention may be embodied and a detailed disclosure of the presently preferred embodiment itself. Systems similar to the system shown herein are described extensively in other applications assigned to the assignee of this application, including U.S. Ser. No. 09/564,174 entitled "Apparatus And Method For Encoding And Storage Of Digital Image And Audio Signals" and U.S. Ser. No. 09/563,880, entitled "Apparatus And Method For Decoding Digital Image And Audio Signals" both filed May 3, 2000, the teachings of which are incorporated herein by reference.

Figure 1:
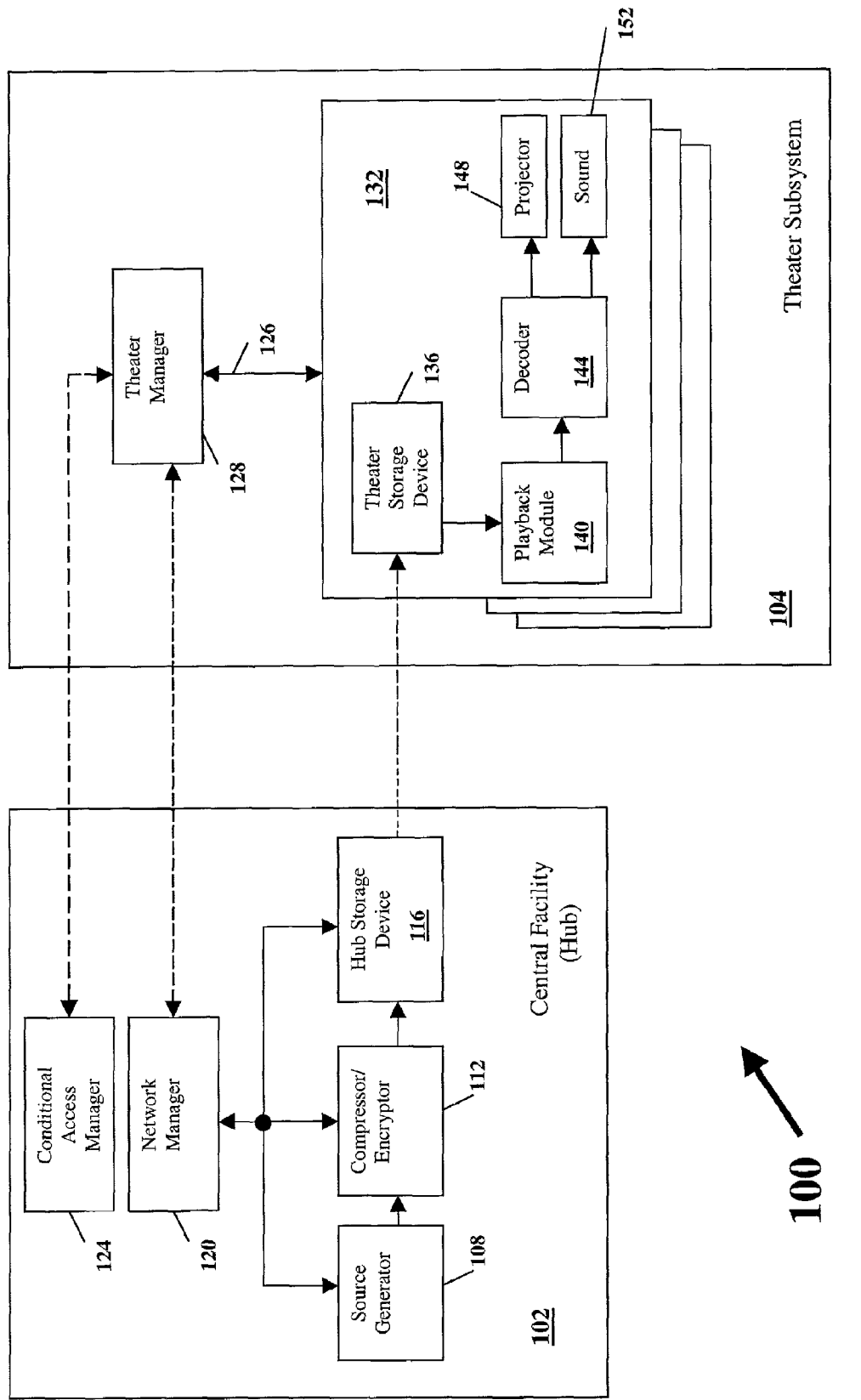
FIG. 1 illustrates a block diagram of a digital cinema system.

A digital cinema system 100 embodying the invention is illustrated in FIG. 1 of the accompanying drawings. The digital cinema system 100 comprises two main systems: at least one central facility or hub 102 and at least one presentation or theater subsystem 104. The hub 102 and the theater subsystem 104 are of a similar design to that of pending U.S. patent application Ser. No. 09/075,152 filed on May 8, 1998, assigned to the same assignee as the present invention, the teachings of which are incorporated herein by reference.

Image and audio information are compressed and stored on a storage medium, and distributed from the hub 102 to the theater subsystem 104. Generally, one theater subsystem 104 is utilized for each theater or presentation location in a network of presentation locations that is to receive image or audio information, and includes some centralized equipment as well as certain equipment employed for each presentation auditorium.

In the central hub 102, a source generator 108 receives film material and generates a digital version of the film. The digital information is compressed and encrypted by a compressor/encryptor (CE) 112, and stored on a storage medium by a hub storage device 116. A network manager 120 monitors and sends control information to the source generator 108, the CE 112, and the hub storage device 116.

A conditional access manager 124 provides specific electronic keying information such that only specific theaters are authorized to show specific programs.

In the theater subsystem 104, a theater manager 128 controls an auditorium module 132. Based on control information received from the auditorium module 132, a theater storage device 136 transfers compressed information stored on the storage medium to a playback module 140. The playback module 140 receives the compressed information from the theater storage device 136, and prepares the compressed information to a predetermined sequence, size and data rate. The playback module 140 outputs the compressed information to a decoder 144. The decoder 144 inputs compressed information from the playback module 140 and performs decryption, decompression and formatting, and outputs the information to a projector 148 and a sound module 152. The projector 148 plays the information on a projector and the sound module 152 plays sound information on a sound system, both under control of the auditorium module 132.

In operation, the source generator 108 provides digitized electronic image and/or programs to the system. Typically, the source generator 108 receives film material and generates a magnetic tape containing digitized information or data. The film is digitally scanned at a very high resolution to create the digitized version of the motion picture or other program. Typically, a known "telecine" process generates the image information while well-known digital audio conversion processing generates the audio portion of the program. The images being processed need not be provided from a film, but can be single picture or still frame type images, or a series of frames or pictures, including those shown as motion pictures of varying length. These images can be presented as a series or set to create what are referred to as image programs. In addition, other material can be provided such as visual cue tracks for sight-impaired audiences, subtitling for foreign language and/or hearing impaired audiences, or multimedia time cue tracks. Similarly, single or sets of sounds or recordings are used to form desired audio programs.

Alternatively, a high definition digital camera or other known digital image generation device or method may provide the digitized image information. The use of a digital camera, which directly produces the digitized image information, is especially useful for live event capture for substantially immediate or contemporaneous distribution. Computer workstations or similar equipment can also be used to directly generate graphical images that are to be distributed.

The digital image information or program is presented to the compressor/encryptor 112, which compresses the digital signal using a preselected known format or process, reducing the amount of digital information necessary to reproduce the original image with very high quality. Preferably, an ABSDCT technique is used to compress the image source. A suitable ABSDCT compression technique is disclosed in U.S. Pat. Nos. 5,021,891, 5,107,345, and 5,452,104, the teachings of which are incorporated herein by reference. The audio information may also be digitally compressed using standard techniques and may be time synchronized with the compressed image information. The compressed image and audio information is then encrypted and/or scrambled using one or more secure electronic methods.

The network manager 120 monitors the status of compressor/encryptor 112, and directs the compressed information from the compressor/encryptor 112 to the hub storage device 116. The hub storage device 116 is comprised of one or more storage media (shown in FIG. 8). The storage medium/media may be any type of high capacity data storage device including, but not limited to, one or more digital versatile disks (DVDs) or removable hard drives (RHDs). Upon storage of the compressed information onto the storage medium, the storage medium is physically transported to the theater subsystem 104, and more specifically, to the theater storage device 136.

Alternatively, the compressed image and audio information may each be stored in a non-contiguous or separate manner independent of each other. That is, a means is provided for compressing and storing audio programs associated with image information or programs but segregated in time. There is no requirement to process the audio images at the same time. A predefined identifier or identification mechanism or scheme is used to associate corresponding audio and image programs with each other, as appropriate. This allows linking of one or more preselected audio programs with at least one preselected image program, as desired, at a time of presentation, or during a presentation event. That is, while not initially time synchronized with the compressed image information, the compressed audio is linked and synchronized at presentation of the program.

Further, maintaining the audio program separate from the image program allows for synchronizing multiple languages from audio programs to the image program, without having to recreate the image program for each language. Moreover, maintaining a separate audio program allows for support of multiple speaker configurations without requiring interleaving of multiple audio tracks with the image program.

In addition to the image program and the audio program, a separate promotional program, or promo program, may be added to the system. Typically, promotional material changes at a greater frequency than the feature program. Use of a separate promo program allows promotional material to be updated without requiring new feature image programs. The promo program comprises information such as advertising (slides, audio, motion or the like) and trailers shown in the theater.

Because of the high storage capacity of storage media such as DVDs and RHDs, thousands of slides or pieces of advertising may be stored. The high storage volume allows for customization, as specific slides, advertisements or trailers may be shown at specific theaters at targeted customers.

Although FIG. 1 illustrates the compressed information in the storage device 116 and physically transporting storage medium/media to the theater subsystem 104, it should be understood that the compressed information, or portions thereof, may be transmitted to the theater storage device 136 using any of a number wireless or wired transmission methods. Transmission methods include satellite transmission, well-known multi-drop, Internet access nodes, dedicated telephone lines, or point-to-point fiber optic networks.

Figure 2:
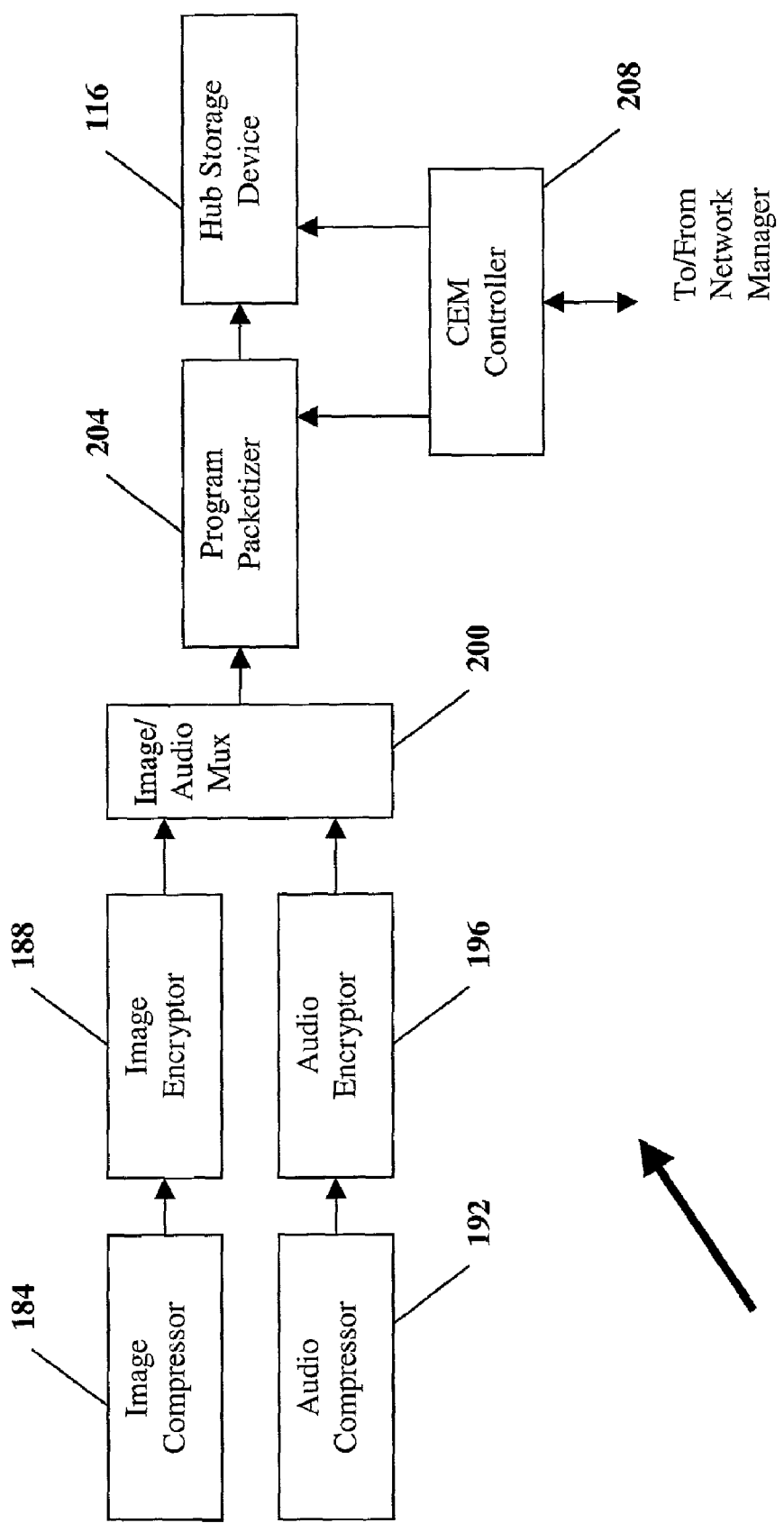
FIG. 2 is a block diagram of a compressor/encryptor circuit used in the system of FIG. 1.

A block diagram of the compressor/encryptor 112 is illustrated in FIG. 2 of the accompanying drawings. Similar to the source generator 108, the compressor/encryptor 112 may be part of the central hub 102 or located in a separate facility. For example, the compressor/encryptor 112 may be located with the source generator 108 in a film or television production studio. In addition, the compression process for either image or audio information or data may be implemented as a variable rate process.

The compressor/encryptor 112 receives a digital provided by the source generator 108. The digital image and audio information may be stored in frame buffers (not shown) before further processing. The digital image signal is passed to an image compressor 184. In a preferred embodiment, the image compressor 184 processes a digital image signal using the ABSDCT technique described in the abovementioned U.S. Pat. Nos. 5,021,891, 5,107,345, and 5,452,104.

In the ABSDCT technique, the color input signal is generally in a YIQ format, with Y being the luminance, or brightness, component, and I and Q being the chrominance, or color, components. Other formats such as the YUV or RGB formats may also be used. Because of the low spatial sensitivity of the eye to color, the ABSDCT technique sub-samples the color (I and Q) components by a factor of two in each of the horizontal and vertical directions. Accordingly, four luminance components and two chrominance components are used to represent each spatial segment of image input.

Each of the luminance and chrominance components is passed to a block interleaver. Generally, a 16×16 block is presented to the block interleaver, which orders the image samples within the 16×16 blocks to produce blocks and composite sub-blocks of data for discrete cosine transform (DCT) analysis. The DCT operator is one method of converting a time-sampled signal to a frequency representation of the same signal. By converting to a frequency representation, the DCT techniques have been shown to allow for very high levels of compression, as quantizers can be designed to take advantage of the frequency distribution characteristics of an image.

Preferably, one 16×16 DCT is applied to a first ordering, four 8×8 DCTs are applied to a second ordering, 16 4×4 DCTs are applied to a third ordering, and 64 2×2 DCTs are applied to a fourth ordering.

The DCT operation reduces the spatial redundancy inherent in the image source. After the DCT is performed, most of the image signal energy tends to be concentrated in a few DCT coefficients.

For the 16×16 block and each sub-block, the transformed coefficients are analyzed to determine the number of bits required to encode the block or sub-block.

Then, the block or the combination of sub-blocks, which requires the least number of bits to encode, is chosen to represent the image segment. For example, two 8×8 sub-blocks, six 4×4 sub-blocks, and eight 2×2 sub-blocks may be chosen to represent the image segment.

The chosen block or combination of sub-blocks is then properly arranged in order. The DCT coefficient values may then undergo further processing such as, but not limited to, frequency weighting, quantization, and coding (such as variable length coding) using known techniques, in preparation for transmission. The compressed image signal is then provided to at least one image encryptor 188.

The digital audio signal is generally passed to an audio compressor 192. Preferably, the audio compressor 192 processes multi-channel audio information using a standard digital audio compression algorithm. The compressed audio signal is provided to at least one audio encryptor 196. Alternatively, the audio information may be transferred and utilized in an uncompressed, but still digital, format.

The image encryptor 192 and the audio encryptor 196 encrypts the compressed image and audio signals, respectively, using any of a number of known encryption techniques. The image and audio signals may be encrypted using the same or different techniques. In a preferred embodiment, an encryption technique, which comprises real-time digital sequence scrambling of both image and audio programming, is used.

At the image and audio encryptors 192 and 196, the programming material is processed by a scrambler/encryptor circuit that uses time-varying electronic keying information (typically changed several times per second). The scrambled program information can then be stored or transmitted, such as over the air in a wireless link, without being decipherable to anyone who does not possess the associated electronic keying information used to scramble the program material or digital data.

Returning now to FIG. 2, in addition to scrambling, the image encryptor 192 may add a "watermark" or "fingerprint" which is usually digital in nature, to the image programming. This involves the insertion of a location specific and/or time specific visual identifier into the program sequence. That is, the watermark is constructed to indicate the authorized location and time for presentation, for more efficiently tracking the source of illicit copying when necessary. The watermark may be programmed to appear at frequent, but pseudo-random periods in the playback process and would not be visible to the viewing audience. The watermark is perceptually unnoticeable during presentation of decompressed image or audio information at what is predefined as a normal rate of transfer. However, the watermark is detectable when the image or audio information is presented at a rate substantially different from that normal rate, such as at a slower "non-real-time" or still frame playback rate. If an unauthorized copy of a program is recovered, the digital watermark information can be read by authorities, and the theater from which the copy was made can be determined. Such a watermark technique may also be applied or used to identify the audio programs.

The compressed and encrypted image and audio signals are both presented to a multiplexer 200. At the multiplexer 200, the image and audio information is multiplexed together along with time synchronization information to allow the image and audio-streamed information to be played back in a time aligned manner at the theater subsystem 104. The multiplexed signal is then processed by a program packetizer 204, which packetizes the data to form the program stream. By packetizing the data, or forming "data blocks," the program stream may be monitored during decompression at the theater subsystem 104 (see FIG. 1) for errors in receiving the blocks during decompression. Requests may be made by the theater manager 128 of the theater subsystem 104 to acquire data blocks exhibiting errors.

Accordingly, if errors exist, only small portions of the program need to be replaced, instead of an entire program. Requests of small blocks of data may be handled over a wired or wireless link. This provides for increased reliability and efficiency.

Alternatively, the image and audio portions of a program are treated as separate and distinct programs. Thus, instead of using the multiplexer 200 to multiplex the image and audio signals, the image signals are separately packetized. In this way the image program may be transported exclusive of the audio program, and vice versa. As such, the image and audio programs are assembled into combined programs only at playback time. This allows for different audio programs to be combined with image programs for various reasons, such as varying languages, providing post-release updates or program changes, to fit within local community standards, and so forth. This ability to flexibly assign audio different multi-track programs to image programs is very useful for minimizing costs in altering programs already in distribution, and in addressing the larger multi-cultural markets now available to the film industry.

The compressors 184 and 192, the encryptors 188 and 196, the multiplexer 200, and the program packetizer 204 may be implemented by a compression/encryption module (CEM) controller 208, a software-controlled processor programmed to perform the functions described herein. That is, they can be configured as generalized function hardware including a variety of programmable electronic devices or computers that operate under software or firmware program control. They may alternatively be implemented using some other technology, such as through an ASIC or through one or more circuit card assemblies, i.e. constructed as specialized hardware.

The image and audio program stream is sent to the hub storage device 116. The CEM controller 208 is primarily responsible for controlling and monitoring the entire compressor/encryptor 112. The CEM controller 208 may be implemented by programming a general-purpose hardware device or computer to perform the required functions, or by using specialized hardware. Network control is provided to CEM controller 208 from the network manager 120 (FIG. 2) over a hub internal network, as described herein. The CEM controller 208 communicates with the compressors 184 and 192, the encryptors 188 and 196, the multiplexer 200, and the packetizer 204 using a known digital interface and controls the operation of these elements. The CEM controller 208 may also control and monitor the storage module 116, and the data transfer between these devices.

The storage device 116 is preferably constructed as one or more RHDs, DVDs disks or other high capacity storage medium/media, which in general is of similar design as the theater storage device 116 in theater subsystem 104. However, those skilled in the art will recognize that in some applications other media may be used including but not limited to DVDs (Digital Versatile Disks) or so-called JBODs ("Just a Bunch Of Drives"). The storage device 116 receives the compressed and encrypted image, audio, and control data from the program packetizer 204 during the compression phase. Operation of the storage device 116 is managed by the CEM controller 208.

Figure 3:
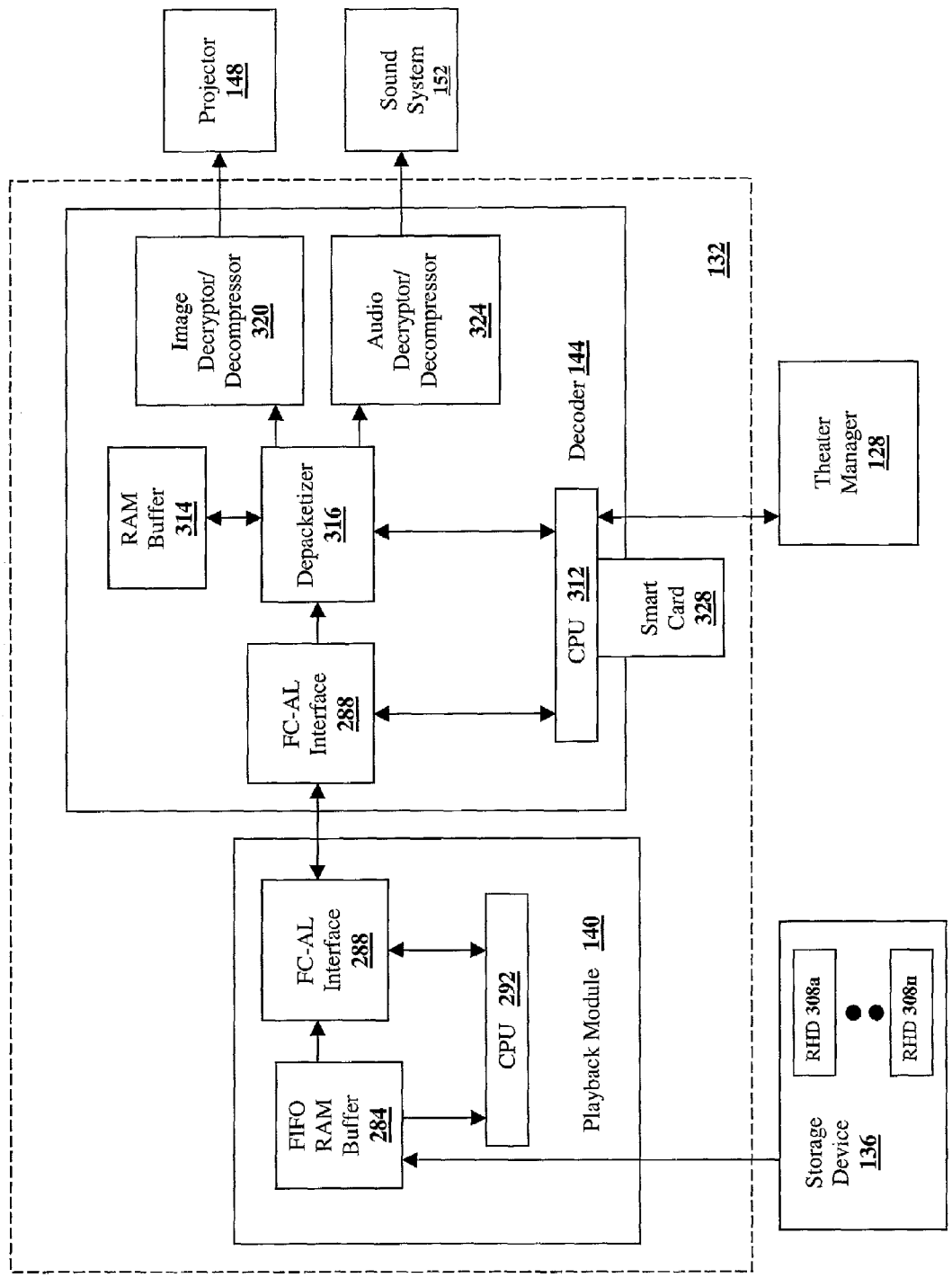
FIG. 3 illustrates an auditorium module used in the system of FIG. 1.

FIG. 3 of the accompanying drawings illustrates operation of the auditorium module 132 using one or more RHDs (removable hard drives) 308. For speed, capacity, and convenience reasons, it may be desirable to use more than one RHD 308*a* to 308*n*. When reading data sequentially, some RHDs have a "prefetching" feature that anticipates a following read command based upon a recent history of commands. This prefetching feature is useful in that the time required to read sequential information off the disk is reduced. However, the time needed to read non-sequential information off the disk may be increased if the RHD receives a command that is unexpected. In such a case, the prefetching feature of the RHD may cause the random access memory of the RHD to be full, thus requiring more time to access the information requested. Accordingly, having more than one RHD is beneficial in that a sequential stream of data, such as an image program, may be read faster. Further, accessing a second set of information on a separate RHD disk, such as audio programs, trailers, control information, or advertising, is advantageous in that accessing such information on a single RHD is more time consuming.

Thus, compressed information is read from one or more RHDs 308 into a buffer 284. The FIFO-RAM buffer 284 in the playback module 140 receives the portions of compressed information from the storage device 136 at a predetermined rate. The FIFO-RAM buffer 284 is of a sufficient capacity such that the decoder 144, and subsequently the projector 148, is not overloaded or under-loaded with information. Preferably, the FIFO-RAM buffer 284 has a capacity of about 100 to 200 MB. Use of the FIFO-RAM buffer 284 is a practical necessity because there may be a several second delay when switching from one drive to another.

The portions of compressed information is output from the FIFO-RAM buffer into a network interface 288, which provides the compressed information to the decoder 144. Preferably, the network interface 288 is a fiber channel arbitrated loop (FC-AL) interface. Alternatively, although not specifically illustrated, a switch network controlled by the theater manager 128 receives the output data from the playback module 140 and directs the data to a given decoder 144. Use of the switch network allows programs on any given playback module 140 to be transferred to any given decoder 144.

When a program is to be viewed, the program information is retrieved from the storage device 136 and transferred to the auditorium module 132 via the theater manager 128. The decoder 144 decrypts the data received from the storage device 136 using secret key information provided only to authorized theaters, and decompresses the stored information using the decompression algorithm which is inverse to the compression algorithm used at source generator 108. The decoder 144 includes a converter (not shown in FIG. 3) which converts the decompressed image information to an image display format used by the projection system (which may be either an analog or digital format) and the image is displayed through an electronic projector 148. The audio information is also decompressed and provided to the auditorium's sound system 152 for playback with the image program.

The decoder 144 processes a compressed/encrypted program to be visually projected onto a screen or surface and audibly presented using the sound system 152.

As shown in FIG. 3, the decoder 144 comprises a controlling CPU (central processing unit) 312, which controls the decoder. Alternatively, the decoder may be controlled via the theater manager 128. The decoder further comprises at least one depacketizer 316, a buffer 314, an image decryptor/decompressor 320, and an audio decryptor/decompressor 324. The buffer may temporarily store information for the depacketizer 316. All of the above-identified units of the decoder 144 may be implemented on one or more circuit card assemblies. The circuit card assemblies may be installed in a self-contained enclosure that mounts on or adjacent to the projector 148. Additionally, a cryptographic smart card 328 may be used which interfaces with controlling CPU 312 and/or image decryptor/decompressor 320 for transfer and storage of unit-specific cryptographic keying information.

The depacketizer 316 identifies and separates the individual control, image, and audio packets that arrive from the playback module 140, the CPU 312 and/or the theater manager 128. Control packets may be sent to the theater manager 128 while the image and audio packets are sent to the image and audio decryption/decompression systems 320 and 324, respectively. Read and write operations tend to occur in bursts. Therefore, the buffer 314 is used to stream data smoothly from the depacketizer 316 to the projection equipment.

The theater manager 128 configures, manages the security of, operates, and monitors the theater subsystem 104. This includes the external interfaces, image and audio decryption/decompression modules 320 and 324, along with projector 148 and the sound system module 152. Control information comes from the playback module 140, the CPU 312, the theater manager system 128, a remote control port, or a local control input, such as a control panel on the outside of the auditorium module 132 housing or chassis. The decoder CPU 312 may also manage the electronic keys assigned to each auditorium module 132. Pre-selected electronic cryptographic keys assigned to auditorium module 132 are used in conjunction with the electronic cryptographic key information that is embedded in the image and audio data to decrypt the image and audio information before the decompression process. Preferably, the CPU 312 uses a standard microprocessor running embedded in the software of each auditorium module 132, as a basic functional or control element.

In addition, the CPU 312 is preferably configured to work or communicate certain information with theater manager 128 to maintain a history of presentations occurring in each auditorium. Information regarding this presentation history is then available for transfer to the hub 102 using the return link, or through a transportable medium at preselected times.

The image decryptor/decompressor 320 takes the image data stream from depacketizer 316, performs decryption, adds a watermark and reassembles the original image for presentation on the screen. The output of this operation generally provides standard analog RGB signals to digital cinema projector 148. Typically, decryption and decompression are performed in real-time, allowing for real-time playback of the programming material.

The image decryptor/decompressor 320 decrypts and decompresses the image data stream to reverse the operation performed by the image compressor 184 and the image encryptor 188 of the hub 102. Each auditorium module 132 may process and display a different program from other auditorium modules 132 in the same theater subsystem 104 or one or more auditorium modules 132 may process and display the same program simultaneously. Optionally, the same program may be displayed on multiple projectors, the multiple projectors being delayed in time relative to each other.

Image program data streams undergo dynamic image decompression using an inverse ABSDCT algorithm or other image decompression process symmetric to the image compression used in the central hub compressor/encryptor 112. If image compression is based on the ABSDCT algorithm the decompression process includes variable length decoding, inverse frequency weighting, inverse differential quad-tree transformation, IDCT, and DCT block combiner deinterleaving. The processing elements used for decompression may be implemented in dedicated specialized hardware configured for this function such as an ASIC or one or more circuit card assemblies. Alternatively, the decompression processing elements may be implemented as standard elements or generalized hardware including a variety of digital signal processors or programmable electronic devices or computers that operate under the control of special function software or firmware programming. Multiple ASICs may be implemented to process the image information in parallel to support high image data rates.

Encryption generally involves digital sequence scrambling or direct encryption of the compressed signal. The words "encryption" and "scrambling" are used interchangeably and are understood to mean any means of processing digital data streams of various sources using any of a number of cryptographic techniques to scramble, cover, or directly encrypt said digital streams using sequences generated using secret digital values ("keys") in such a way that it is very difficult to recover the original data sequence without knowledge of the secret key values.

Each image or audio program may use specific electronic keying information which is provided, encrypted by presentation-location or theater-specific electronic keying information, to theaters or presentation locations authorized to show that specific program. The conditional access manager (CAM) 124 handles this function. The encrypted working key needed by the auditorium to decrypt the stored information is transmitted, or otherwise delivered, to the authorized theaters prior to playback of the program. Note that the stored program information may potentially be transmitted days or weeks before the authorized showing period begins, and that the encrypted image or audio working key may be transmitted or delivered just before the authorized playback period begins. The encrypted working key may also be transferred using a low data rate link, or a transportable storage element such as a magnetic or optical media disk, a smart card, or other devices having erasable memory elements. The encrypted working key may also be provided in such a way as to control the period of time for which a specific theater complex or auditorium is authorized to show the program.

Each theater subsystem 104 that receives an encrypted working key decrypts this value using its auditorium specific key, and stores this decrypted working key in a memory device or other secured memory. When the program is to be played back, the theater or location specific and program specific keying information is used, preferably with a symmetric algorithm, that was used in the encryptor 112 in preparing the encrypted signal to now descramble/decrypt program information in real-time.

The decryption processes use previously provided unit-specific and program-specific electronic cryptographic key information to decrypt the image and audio information. Each theater subsystem 104 is provided with the necessary cryptographic key information for all programs authorized to be shown on each auditorium module 132. Cryptographic keys typically 56 bits or longer are specific to each authorized theater manager 128, to each auditorium and to the specific image and/or audio program. A time varying key sequence may be used within the image and/or audio program. Smart card technology, such as smart card 328, is used to obtain the cryptographic keys and to transfer those keys to the signal decryption units. Physical and electronic security measures are used to prevent tampering with this key information and to detect attempted tampering or compromise. The key is stored in such a way that it can be erased in the event of detected tampering attempts.

Figure 4:
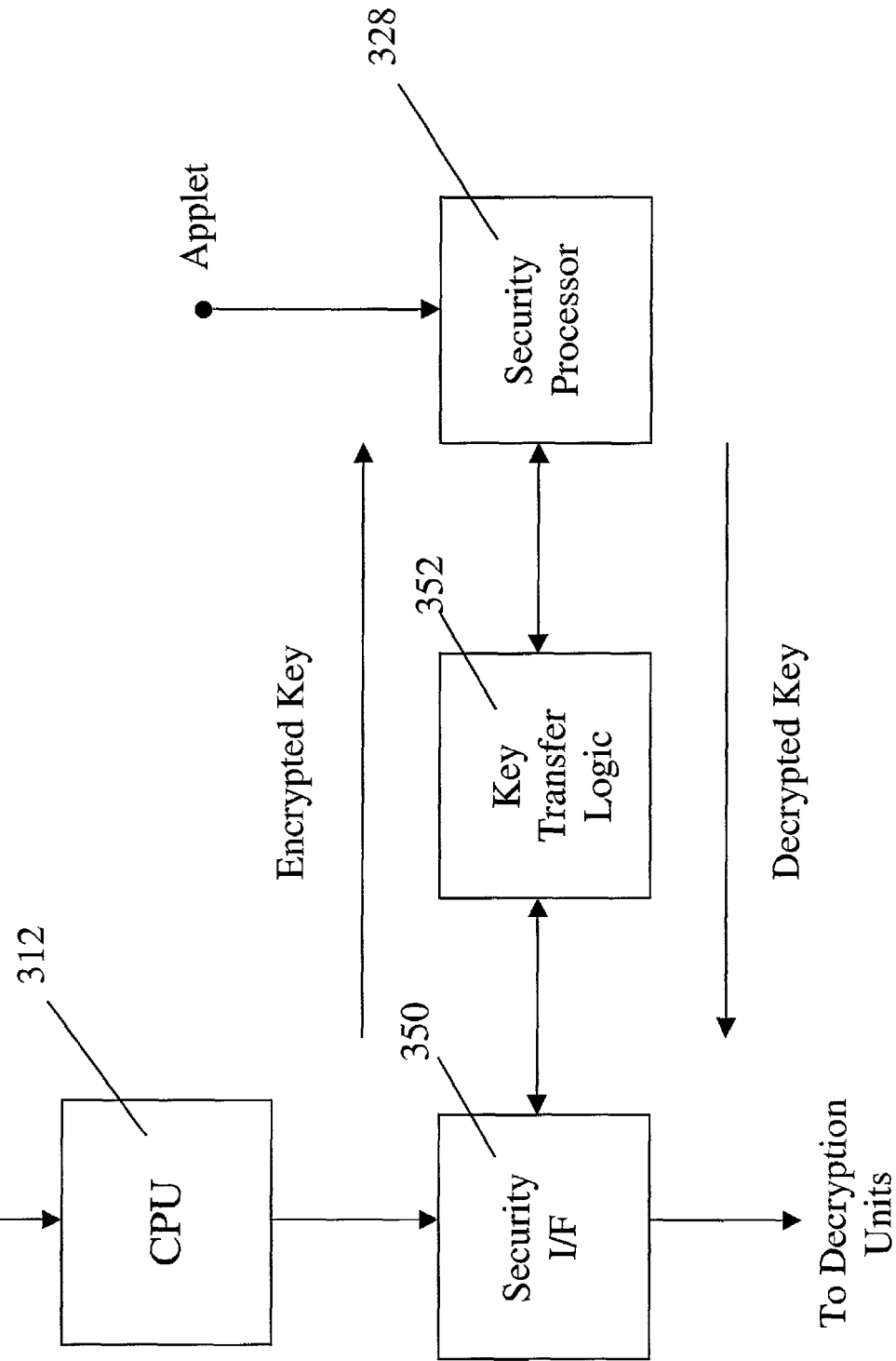
FIG. 4 is a block diagram showing part of the auditorium module of FIG. 3 in greater detail.

FIG. 4 of the accompanying drawings illustrates how the CPU 312 and the smart card 328 interact with each other and with other parts of the auditorium module 132 (shown in FIG. 3). As shown in FIG. 4, the CPU 312 is connected to receive decryption data signals from the central facility (FIG. 1) via the theatre manager 128 (see FIG. 3). Although not shown in the drawings, it will be appreciated that the decryption data signals need not be delivered to the theatre subsystem 104 via the theatre manager 128. The signals may be delivered on a separate medium and input to the theatre subsystem 104 via the theatre storage device 136 for example. However, transfer via the theatre manager 128 is preferred because it keeps the decryption data signals separate from the video and audio information delivered to the theatre subsystem 104 by way of the exemplary removable hard drives (RHDs) 308 shown in FIG. 3. It also enables the decryption data signals to be delivered at a specified time, rather than merely some time in advance of when they are needed.

The decryption data signals received from the central facility via the theatre manager 128 contain a small amount of data for use by the CPU 312. Most of the data in the received signals, however, is in encrypted form and, as such, is meaningless to the CPU 312. The encrypted data received by the CPU 312 is passed via a security interface 350 and a key transfer logic 352 to the smart card 328.

The security interface 350 serves to isolate connection between the CPU 312 and the smart card 328 from connection between the smart card 328 and other decryption units in the auditorium module, including the image decryptor/decompressor 320 and the audio decryptor/decompressor 324 (see FIG. 3). In this way, the encrypted data is passed from the CPU to the smart card and decrypted data is passed from the smart card to the decryption units in the auditorium module. Thus, the CPU 312 never has access to the decrypted data, so a prospective thief will not be able to gain access to the decrypted data by interrogating the CPU.

The key transfer logic 352 enables different smart card technologies, or entirely different technologies such as pre-programmed flash memory cards, to be used without having to redesign the whole system. For example, a smart card in which data is transferred at, say, 3 MHz in both directions on the same line may easily be replaced by a different smart card in which data is transferred at, say, 40 MHz in both directions on different lines simply by reprogramming the key transfer logic 352. Dedicated hardware could, of course, be built into the security interface 350 to perform the same function as the key transfer logic, but this would not be so "future proof" as using the key transfer logic 352. It also enables the smart card technology to be readily changed or replaced in the even of a serious breach of security.

The smart card comprises a main processor (not shown) and co-processor hardware implementation of a DES engine (also not shown) and/or other encryption techniques. Initially, the smart card contains no data. When the card is inserted into the system and/or during initial start up of the system, the CPU 312 is arranged first to check for the presence of the smart card and then to download an applet into the smart card 328. The applet may be stored in memory (not shown) associated with the CPU but is preferably only delivered to the CPU 312 via the theatre manager 128 when required for downloading into the CPU. Delivery of the applet only when required has clear security advantages.

Once the applet has been correctly downloaded, it begins running on the main processor of the smart card 328. The applet includes a routine that causes an initial message to be sent to the CPU 312. In this way, the CPU receives confirmation that the smart card, which has been installed, is of the correct type (if it is not, then the applet may not run properly) and is working properly.

During normal operation of the auditorium module 132, decryption keys are used by the image decryptor/decompressor 320 and the audio decryptor/decompressor 324 to decrypt the encrypted image and audio data so that images can be displayed and audio broadcast within the auditorium. These decryption keys will be referred to in this part of the description as "working keys".

The working keys change from time to time. For example, they may be valid for the few days that the movie is scheduled to be shown in the auditorium, for one showing of a movie, or even for only part of the movie. Each time the working key is to be changed, data defining a new working key is delivered to the auditorium module via the theatre manager 128 (see FIG. 1) or otherwise. In order to protect the new working key, the data is delivered in encrypted form and thus a different decryption key is required to decrypt the data defining the new working key. This decryption key will be referred to herein as a "program key".

The applet in the smart card transfers data representing the program key into the encryption co-processor hardware of the smart card. The data may be generated by the running of the applet or it may be downloaded with the applet before being transferred to the co-processor of the smart card. With the program key installed in the co-processor, the smart card is able to decrypt incoming data and extract working keys therefrom, when required.

The encrypted signal from the theatre manager 128 includes data identifying the origin of the data, i.e. the central facility 102 (see FIG. 1). When the signal has been decrypted by the smart card the identifying data is checked to ensure that the working key has indeed come from the central facility and not from some other source.

The encrypted signal containing the working key(s) from the theatre manager 128 is accompanied by data identifying where the key(s) are to be used. Different working keys are used in the decryption of the image and in the decryption of the audio, and it is therefore necessary to know the destination for each working key. The location data is processed by the CPU 312. The CPU 312 sends appropriate commands to the security interface 350 to ensure that the decrypted working key from the smart card is sent to the correct destination.

The encrypted signal from the theatre manager 128 is also accompanied by data identifying when the decryption unit(s) 320,324 should begin using the newly decrypted working key and the period during which the working key is valid. This is useful at two levels. Firstly, it enables data for a working key to be sent ahead of time, thereby enabling the key to be sent at a time convenient to the central facility. Secondly, it facilitates changeover from one working key to another. The amount of time that the smart card takes to decrypt the working key is variable. The encrypted working key data of necessity, therefore, has to be delivered at least a few frames in advance of the time when the new working key will begin to be used. Each video frame is individually identified and it is therefore possible to specify down to an individual frame when the new working key should start to be used.

The data accompanying the encrypted signal is used by the CPU 312 and the smart card 328 to supervise transfer of the decrypted working key from the smart card via the key transfer logic and security interface to the specified decryption unit(s) 320,324 at the required time. Once the decrypted working key has been output from the smart card 328, the applet causes the smart card to send a "decryption completed" message to the CPU 312. This information is added to the above-mentioned presentation history maintained by the CPU 312 with the theatre manager 128.

Referring back to FIG. 1, the decoder chassis 144 includes a fiber channel interface 288, the depacketizer 316, the decoder controller or CPU 312, the image decryptor/decompressor 320, the audio decryptor/decompressor 324, and the smart card 328. The decoder chassis 144 is a secure, self-contained chassis that also houses the smart card 328 interface, internal power supply and/or regulation, cooling fans (as necessary), a local control panel, and external interfaces.

The local control panel (not shown) may use any of various known input devices such as a membrane switch flat panel with embedded LED indicators. The local control panel typically uses or forms part of a hinged access door to allow entry into the chassis interior for service or maintenance. This door has a secure lock to prevent unauthorized entry, theft, or tampering of the system. The smart card 328 is installed inside the decoder chassis 144, secured behind the locked front panel. The smart card slot is accessible only inside the secured front panel. The RGB signal output from the image decryptor/decompressor 320 to the projector 148 is connected securely within the decoder chassis 144 in such a way that the RGB signals cannot be accessed while the decoder chassis 144 is mounted to the projector housing. Security interlocks may be used to prevent operation of the decoder 144 when it is not correctly installed to the projector 148.

It will be appreciated from the foregoing description that the use of a smart card or other removable programmable device to decrypt working keys as and when they are required and do so that decryption as an operation separate and isolated from the rest of the theatre subsystem enables a good level of security to be achieved. The CPU 312 in the auditorium 132 never "sees" the working keys in decrypted form and so security cannot be breached by interrogation of the CPU. This, together with the above-discussed security in the cabinet, provides a secure environment for reception decoding and displaying of a movie program.

The audio decryptor/decompressor 324 shown in FIG. 3 operates in a similar manner on the audio data. The audio decryptor/decompressor 324 takes the audio data stream from the depacketizer 316, performs decryption, and reassembles the original audio for presentation on a theater's speakers or audio sound system 152. The output of this operation provides standard line level audio signals to the sound system 152.

Similar to the image decryptor/decompressor 320, the audio decryptor/decompressor 324 reverses the operation performed by the audio compressor 192 and the audio encryptor 196 of the hub 102. Using electronic keys from the cryptographic smart card 328 in conjunction with the electronic keys embedded in the data stream, the decryptor 324 decrypts the audio information. The decrypted audio data is then decompressed.

Audio decompression is performed with an algorithm symmetric to that used at the central hub 102 for audio compression. Multiple audio channels, if present, are decompressed. The number of audio channels is dependent on the multi-phonic sound system design of the particular auditorium, or presentation system. Additional audio channels may be transmitted from the central hub 102 for enhanced audio programming for purposes such as multi-language audio tracks and audio cues for sight impaired audiences. The system may also provide additional data tracks synchronized to the image programs for purposes such as multimedia special effects tracks, subtitling, and special visual cue tracks for hearing impaired audiences.

As discussed earlier, audio and data tracks may be time synchronized to the image programs or may be presented asynchronously without direct time synchronization. Image programs may consist of single frames (i.e., still images), a sequence of single frame still images, or motion image sequences of short or long duration.

If necessary, the audio channels are provided to an audio delay element, which inserts a delay as needed to synchronize the audio with the appropriate image frame. Each channel then goes through a digital to analog conversion to provide what are known as "line level" outputs to sound system 152. That is, the appropriate analog level or format signals are generated from the digital data to drive the appropriate sound system. The line level audio outputs typically use standard XLR or AES/EBU connectors found in most theater sound systems.

The sound system 152 presents the audio portion of a program on the theater's speakers. Preferably, the sound system 152 receives up to 12 channels of standard format audio signals, either in digital or analog format, from the audio decryptor/decompressor 324.

Alternatively, the playback module 140 and the decoder 144 may be integrated into a single playback-decoder unit 332. Combining the playback module 140 and the decoder module 148 results in cost and access time savings in that only a single CPU (292 or 312) is needed to serve the functions of both the playback module 140 and the decoder 144. Combination of the playback module 140 and the decoder 144 also does not require the use of a fiber channel interface 288.

If multiple viewing locations are desired, information on any storage device 136 is configured to transfer compressed information of a single image program to different auditoriums with preselected programmable offsets or delays in time relative to each other. These preselected programmable offsets are made substantially equal to zero or very small when a single image program is to be presented to selected multiple auditoriums substantially simultaneously. At other times, these offsets can be set anywhere from a few minutes to several hours, depending on the storage configuration and capacity, in order to provide very flexible presentation scheduling. This allows a theater complex to better address market demands for presentation events such as first run films.

Figure 5:
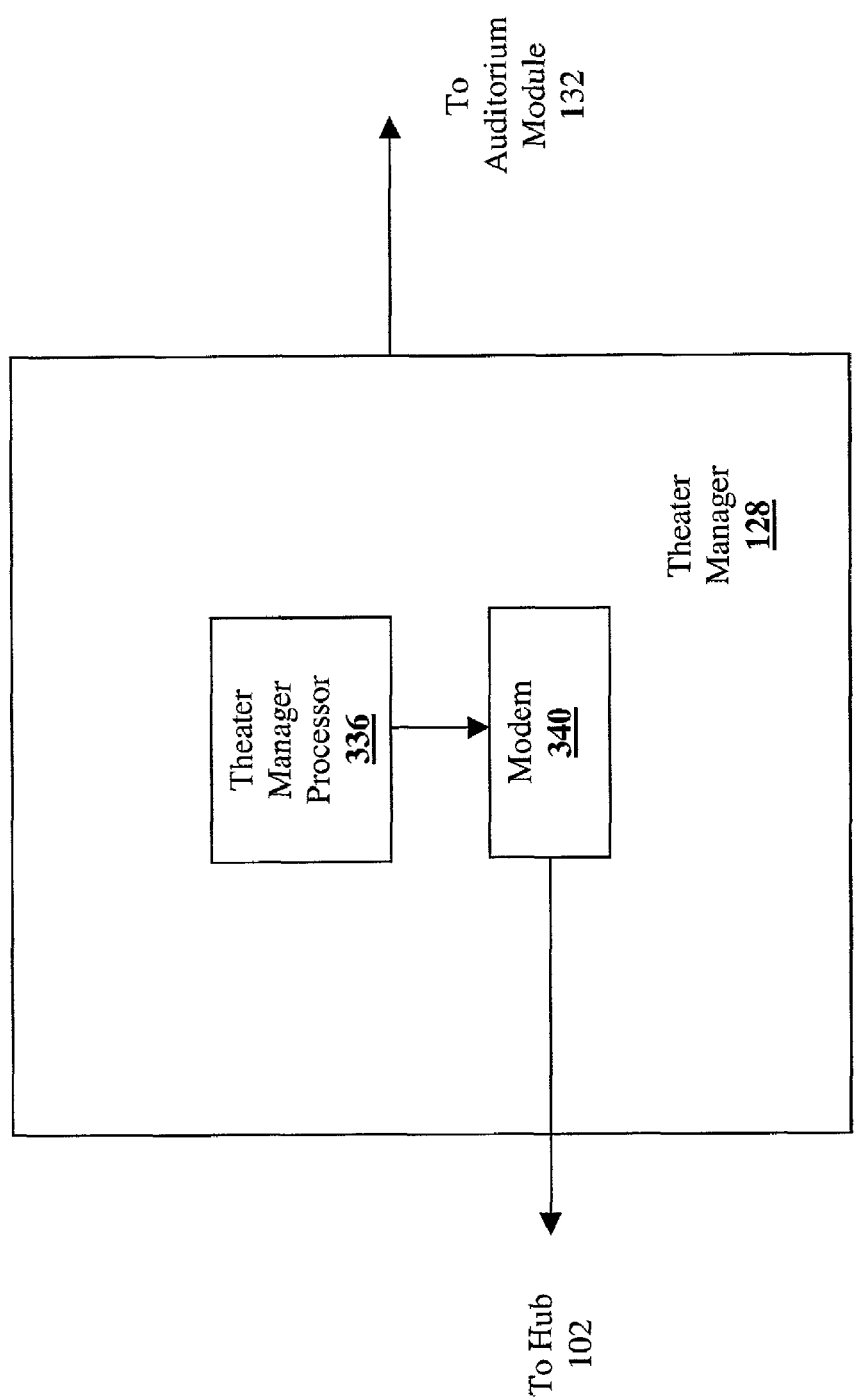
FIG. 5 is a block diagram representing a theater manager and its associated interfaces used in the system of FIG. 1.

The theater manager 128 is illustrated in greater detail in FIG. 5 of the accompanying drawings. Turning now to FIG. 5, the theater manager 128 provides operational control and monitoring of the entire presentation or theater subsystem 104 or one or more auditorium modules 132 within a theater complex. The theater manager 128 may also use a program control means or mechanism for creating program sets from one or more received individual image and audio programs, which are scheduled for presentation on an auditorium system during an authorized interval.

The theater manager 128 comprises a theater manager processor 336 and may optionally contain at least one modem 340, or other device that interfaces with a return link, for sending messages back to central hub 102. The theater manager 128 may include a visual display element such as a monitor and a user interface device such as a keyboard, which may reside in a theater complex manager's office, ticket booth, or any other suitable location that is convenient for theater operations.

The theater manager processor 336 is generally a standard commercial or business grade computer. The theater manager processor 336 communicates with the network manager 120 and conditional access manager 124 (see FIG. 1). Preferably, the modem 340 is used to communicate with the central hub 102. The modem 340 is generally a standard phone line modem that resides in or is connected to the processor, and connects to a standard two-wire telephone line to communicate back to the central hub 102. Alternatively, communications between the theater manager processor 336 and the central hub 102 may be sent using other low data rate communications methods such as Internet, private or public data networking, wireless, or satellite communication systems. For these alternatives, the modem 340 is configured to provide the appropriate interface structure.

The theater manager 128 allows each auditorium module 132 to communicate with each storage device 136. A theater management module interface may include a buffer memory such that information bursts may be transferred at high data rates from the theater storage device 136 using the theater manager interface 126 and processed at slower rates by other elements of the auditorium module 132.

Information communicated between the theater manager 128 and the network manager 120 and/or the conditional access manager 124 include requests for retransmission of portions of information received by the theater subsystem 104 that exhibiting uncorrectable bit errors, monitor and control information, operations reports and alarms, and cryptographic keying information. Messages communicated may be cryptographically protected to provide eavesdropping type security and/or verification and authentication.

The theater manager 128 may be configured to provide fully automatic operation of the presentation system, including control of the playback/display, security, and network management functions. The theater manager 128 may also provide control of peripheral theater functions such as ticket reservations and sales, concession operations, and environmental control. Alternatively, manual intervention may be used to supplement control of some of the theater operations. The theater manager 128 may also interface with certain existing control automation systems in the theater complex for control or adjustment of these functions. The system to be used will depend on the available technology and the needs of the particular theater, as would be known.

Through either control of theater manager 128 or the network manager 120, the invention generally supports simultaneous playback and display of recorded programming on multiple display projectors. Furthermore, under control of theater manager 128 or the network manager 120, authorization of a program for playback multiple times can often be done even though theater subsystem 104 only needs to receive the programming once. Security management may control the period of time and/or the number of playbacks that are allowed for each program.

Through automated control of the theater manager 128 by the network management module 112, a means is provided for automatically storing, and presenting programs. In addition, there is the ability to control certain preselected network operations from a location remote from the central facility using a control element. For example, a television or film studio could automate and control the distribution of films or other presentations from a central location, such as a studio office, and make almost immediate changes to presentations to account for rapid changes in market demand, or reaction to presentations, or for other reason understood in the art.

The theater subsystem 104 may be connected with the auditorium module 132 using a theater interface network (not shown). The theater interface network comprises a local area network (electric or optical) which provides for local routing of programming at the theater subsystem 104. The programs are stored in each storage device 136 and are routed through the theater interface network to one or more of the auditorium system(s) 132 of the theater subsystem 104. The theater interface network 126 may be implemented using any of a number of standard local area network architectures which exhibit adequate data transfer rates, connectivity, and reliability such as arbitrated loop, switched, or hub-oriented networks.

Each storage device 136, as shown in FIG. 1, provides for local storage of the programming material that it is authorized to playback and display. The storage system may be centralized at each theater system. In this case the theater storage device 136 allows the theater subsystem 104 to create presentation events in one or more auditoriums and may be shared across several auditoriums at one time. Depending upon capacity, the theater storage device 136 may store several programs at a time. The theater storage device 136 may be connected using a local area network in such a way that any program may be played back and presented on any authorized presentation system (i.e., projector). Also, the same program may be simultaneously played back on two or more presentation systems.

Having thus described the invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof.

We claim:

1. A decryption system comprising:
a decryption unit for decrypting encrypted program signals using a program decryption key;
a receiver for receiving signals including encrypted data defining the program decryption key;
a security processor; and
an interface providing a first path for transferring the encrypted data from the receiver to the security processor and providing a second path, separate and independent of the first path, for transferring data from the security processor to the decryption unit;
and wherein the security processor is configured to decrypt the encrypted data using a program key so as to extract the program decryption key from the encrypted data, and to output the program decryption key for transfer through the second path of the interface to the decryption unit.

2. A system as claimed in claim 1, wherein the encrypted program signals include encrypted video signals and encrypted audio signals, the decryption unit comprises a video decryption unit for decrypting the encrypted video signals and an audio decryption unit for decrypting the encrypted audio signals, the encrypted data defines both a video working key and an audio working key, and the security processor is configured to extract both the video and the audio working keys from the encrypted data.

3. A system as claimed in claim 1, wherein the security processor is removable.

4. A system as claimed in claim 3, wherein the security processor comprises a smart card.

5. A system as claimed in claim 3, wherein the security processor is configured for operation by a program downloaded from the receiver after the security processor is connected to the system.

6. A system as claimed in claim 5, wherein The downloaded program comprises an applet and data representing the program key.

7. A system as claimed in claim 6, wherein the data representing the program key is downloaded in encrypted form and, once downloaded, is decrypted by the applet.

8. A system as claimed in claim 1, wherein the signals received by the receiver include data identifying the auditorium in which the working decryption key is authorized to be used, the system further comprising a control processor responsive to the data for controlling the decryption unit.

9. A system as claimed in claim 1, wherein the signals received by the receiver include data identifying the time at which the working key is authorized to be used, the system further comprising a control processor responsive to the data for controlling the decryption unit.

10. A system as claimed in claim 2, wherein the signals received by the receiver include data identifying a start frame in the video signals at which the working key shall begin to be used, the system further comprising a control processor responsive to the data for controlling the decryption unit.

11. A system as claimed in claim 1, wherein the security processor does not access the program decryption key in decrypted form.

12. An apparatus for decrypting encrypted program signals, The apparatus comprising:
receiving means for receiving encrypted key signals containing data defining a working decryption key;
means for transferring the encrypted key signals via a first interface;
first means, connected to the first interface, for decrypting the encrypted key signals, using a program key in a decryption algorithm, to determine the working decryption key;
means for transferring the working decryption key via a second interface, different and operationally separate from the first interface; and
second means, connected to the second interface, for decrypting the encrypted program signals using the working decryption key,
and wherein the decryption algorithm is supplied together with the program decryption key via the receiving means and is downloaded therefrom to the first means for decrypting.

13. An apparatus as claimed in claim 12, wherein the encrypted program signals include encrypted video signals and encrypted audio signals, the second means comprises video decrypting means for decrypting the encrypted video signals and audio decrypting means for decrypting the encrypted audio signals, the encrypted key signals define both a video working key and an audio working key, and the first means is configured to extract both the video and the audio working keys from the encrypted key signals.

14. An apparatus as claimed in claim 12, wherein the first means comprises a removable smart card.

15. An apparatus as claimed in claim 14, wherein the smart card is configured for operation by a program downloaded from the receiver after the smart card is connected to the system.

16. An apparatus as claimed in claim 15, wherein the downloaded program comprises an applet and data representing the program key.

17. An apparatus as claimed in claim 12, wherein the signals received by the receiving means include data identifying an auditorium in which the working decryption key is authorized to be used, the system further comprising controlling means responsive to the data for controlling the decryption unit.

18. An apparatus as claimed in claim 12, wherein the signals received by the receiver include data identifying a time at which the working key is authorized to be used, the system further comprising controlling means responsive to the data for controlling the decryption unit.

19. An apparatus as claimed in claim 13, wherein the signals received by the receiving means include data identifying a start frame in the video signals at which the working key shall begin to be used, the system further comprising controlling means responsive to the data for controlling the decryption unit.

20. An apparatus as claimed in claim 12, wherein The decrypted program signals cannot be accessed from the first interface.

21. An apparatus in which, initially, a decryption algorithm received by a control processor is passed via a first interface path to a decryption processor where it is installed together with a program decryption key extracted therefrom, and, subsequently, encrypted working decryption keys received by the control processor are passed on to the decryption processor over the first interface path at which decryption processor they are decrypted using the program decryption key to obtain working decryption keys that are then transferred via a second interface path to decryptors for use in decrypting encrypted program signals input to the decryptors.

22. A method for installing a decryption key, in which, initially, a decryption algorithm received by a control processor is passed via a first interface path to a decryption processor where it is installed together with a program decryption key extracted therefrom, and, subsequently, encrypted working decryption keys received by the control processor are passed on to the decryption processor over the first interface path at which decryption processor They are decrypted using the program decryption key to obtain working decryption keys that are then transferred via a second interface path to decryptors for use in decrypting encrypted program signals input to the decryptors.

23. A method for installing a decryption key, the method comprising:
receiving signals including encrypted data defining a working decryption key;
transferring the encrypted data over a first path to a security processor;
decrypting the encrypted data at the security processor using a program key so as to extract the working decryption key from the encrypted data;
outputting the working decryption key for transfer over a second path, separate and independent of the first path, to a decryption unit; and
decrypting encrypted program signals in a decryption unit using the working decryption key.

24. A method as claimed in claim 23, wherein the encrypted program signals include encrypted video signals and encrypted audio signals, and the encrypted data defines both a video working key and an audio working key, the method comprising the decryption unit comprises:
decrypting the encrypted video signals in a video decryption unit;
decrypting the encrypted audio signals in an audio decryption unit; and
extracting both the video and the audio working keys from the encrypted data.

25. A method as claimed in claim 23, wherein the security processor is removable.

26. A method as claimed in claim 25, wherein the security processor comprises a smart card.

27. A method as claimed in claim 23, further comprising connecting the security processor to the system; and
downloading a program to the processor.

28. A method as claimed in claim 27, wherein the downloaded program comprises an applet and data representing the program key.

29. A method as claimed in claim 28, wherein the data representing the program key is downloaded in encrypted form and, once downloaded, is decrypted by the applet.

30. A method as claimed in claim 23, wherein the received signals include data identifying an auditorium in which the working decryption key is authorized to be used, the method further comprising controlling the decryption unit in response to the data.

31. A method as claimed in claim 23, wherein the received signals include data identifying the time at which the working key is authorized to be used, the method further comprising controlling the decryption unit in response to the data.

32. A method as claimed in claim 24, wherein the received signals include data identifying a start frame in the video signals at which the working key shall begin to be used, the method further comprising controlling the decryption unit in response to the data.

33. A method for decrypting encrypted program signals, the method comprising:
receiving encrypted key signals containing data defining a working decryption key;
transferring the encrypted key signals via a first interface;
decrypting the encrypted key signals, using a program key in a decryption algorithm, to determine the working decryption key;
transferring the working decryption key via a second interface, different and operationally separate from the first interface; and
decrypting the encrypted program signals using the working decryption key,
and wherein the decryption algorithm is supplied together with the program decryption key through the receiving means and is downloaded therefrom to the first means for decrypting.

34. A method as claimed in claim 33, wherein the encrypted program signals include encrypted video signals and encrypted audio signals, and the encrypted key signals define both a video working key and an audio working key, the method further comprising:
extracting both the video and the audio working keys from the encrypted key signals
decrypting the encrypted video signals; and
decrypting the encrypted audio signals.

35. A method as claimed in claim 33, wherein the decrypting of the encrypted key signals is done by a removable smart card.

36. A method as claimed in claim 35, further comprising downloading to the smart card a program for the decrypting of the encrypted key signals.

37. A method as claimed in claim 36, wherein the downloaded program comprises an applet and data representing the program key.

38. A method as claimed in claim 33, wherein the signals received by the receiving means include data identifying an auditorium in which the working decryption key is authorized to be used, the method further comprising controlling the decryption unit in response to the data.

39. A method as claimed in claim 33, wherein the signals received by the receiver include data identifying a time at which the working key is authorized to be used, the method further comprising controlling the decryption unit in response to the data.

40. A method as claimed in claim 34, wherein the signals received by the receiving means include data identifying a start frame in the video signals at which the working key shall begin to be used, the method further comprising controlling the decryption unit in response to the data.

41. A method as claimed in claim 31, wherein the decrypted program signals cannot be accessed through the first interface.

* * * * *